US008458143B2

(12) United States Patent
Loven et al.

(10) Patent No.: US 8,458,143 B2
(45) Date of Patent: Jun. 4, 2013

(54) METHOD OF AND A SYSTEM FOR ERROR CORRECTION OF SERVICE REQUESTS IN AN INFORMATION SYSTEM

(75) Inventors: Lauri Loven, Espoo (FI); Jorkki Hyvonen, Helsinki (FI); Henri Tykka, Espoo (FI); Jukka Laurila, Espoo (FI); Hannu Kauppinen, Helsinki (FI); Pasi Salento, Espoo (FI); Timo Heikkinen, Helsinki (FI)

(73) Assignee: Syslore Oy, Helsinki (FI)

( * ) Notice: Subject to any disclaimer, the term of this patent is extended or adjusted under 35 U.S.C. 154(b) by 2591 days.

(21) Appl. No.: 10/529,243

(22) PCT Filed: Sep. 24, 2003

(86) PCT No.: PCT/FI03/00696
§ 371 (c)(1),
(2), (4) Date: Mar. 25, 2005

(87) PCT Pub. No.: WO2004/030325
PCT Pub. Date: Apr. 8, 2004

(65) Prior Publication Data
US 2006/0136573 A1    Jun. 22, 2006

(30) Foreign Application Priority Data
Sep. 25, 2002   (FI) ..................... 20021711

(51) Int. Cl.
*G06F 17/30* (2006.01)
(52) U.S. Cl.
USPC ....................................... 707/691
(58) Field of Classification Search
None
See application file for complete search history.

(56) References Cited

U.S. PATENT DOCUMENTS

| | | | | |
|---|---|---|---|---|
| 5,200,962 A | * | 4/1993 | Kao et al. | 714/774 |
| 5,509,075 A | * | 4/1996 | Grube et al. | 380/250 |
| 5,754,737 A | | 5/1998 | Gipson | |
| 5,892,919 A | | 4/1999 | Nielsen | |
| 5,949,772 A | * | 9/1999 | Sugikawa et al. | 370/331 |
| 6,092,100 A | | 7/2000 | Berstis et al. | |
| 2002/0026389 A1 | * | 2/2002 | Suzuki | 705/27 |
| 2002/0120647 A1 | * | 8/2002 | Amano | 707/501.1 |

FOREIGN PATENT DOCUMENTS

| | | |
|---|---|---|
| TW | 459456 | 10/2001 |
| WO | WO 01/97081 | 12/2001 |

OTHER PUBLICATIONS

Finnish Office Action in corresponding FI 20021711.

* cited by examiner

*Primary Examiner* — Neveen Abel Jalil
*Assistant Examiner* — Kellye Buckingham
(74) *Attorney, Agent, or Firm* — Young & Thompson

(57) ABSTRACT

An information system including subscriber stations (MS), at least two service sources (2 to 5) providing a respective service to subscriber stations of the system, and an access point (1) arranged to analyze a service request in order to forward the service request to the service source (2) offering the service, the service sources (2 to 5) being arranged to analyze a received service request in order to provide the subscriber station (MS) with the requested service. In order to improve the user friendliness of the system said system further includes a memory (7) for storing service requests which have led to successful identification of the requested service, and an error correction device (6) arranged to correct a received service request by utilizing the service requests stored in the memory (7) if no service source or no service can be identified.

10 Claims, 3 Drawing Sheets

METHOD OF AND A SYSTEM FOR ERROR CORRECTION OF SERVICE REQUESTS IN AN INFORMATION SYSTEM

BACKGROUND OF THE INVENTION

1. Field of the Invention

This invention relates to error correction of service requests transmitted in an information system. In the following the invention will be described by way of example by referring mainly to systems where mobile stations are used for transmitting the service requests. It should, however, be observed that the present invention can also be utilized in systems where some other type of subscriber stations, instead of mobile stations, are used for transmitting the service requests.

2. Description of the Prior Art

Previously there is known an information system with a plurality of service sources and a common access point for receiving and routing service requests. The access point comprises the necessary analyzing capabilities in order to determine which service source of the information system is the target of a received service request. This is carried out by comparing predetermined keywords known by the access point with the content of the received service request. In case a known keyword is identified in the service request, the service request is forwarded from the access point to the service source which provides the requested service.

When a service source receives a service request it carries out an analysis in order to identify the requested service. This is usually carried out by analyzing parameters included in the service request. When a known parameter is found in the message, the service associated with this parameter is provided to the source of the service request, which in a mobile communication system might be the mobile station of a subscriber, for instance.

A problem with the above-described prior art solution is the lack of user friendliness. In order for a user to obtain a specific service it is necessary for the user to transmit a service request with a predetermined syntax. If the user does not know the correct syntax or if the user for some reason transmits a service request with a typing error, the access point and/or the service source of the information system are not able to identify the service requested by the user. Thus the user will not be provided with the desired service.

SUMMARY OF THE INVENTION

An object of the present invention is to provide a solution which improves the user friendliness of an information system.

Another object of the present invention is to provide an efficient and simple solution to implement error correction in an information system including a plurality of service sources providing respective services.

Still another object of the present invention is to provide an error correction solution capable of automatically updating itself as the services offered by an information system are updated.

The above-mentioned and other objects of the present invention are achieved with the method of independent clam 1, the information system of independent claim 3 and the error correction device of independent claim 7.

The advantage obtained with the solution of the independent claims is that the user friendliness of the system can be improved. The error correction capabilities make it possible for the information system to correct service requests including errors such that the subscriber having transmitted a service request with an error will receive the desired service anyway.

The solution of the independent claims involves a self-learning error correction capability. This is achieved as service requests which have led to a successful identification of the requested service are stored in a memory. This memory will thus include only those service requests whose contents are correct, as they have all previously led to successful identification of the requested service. It is not necessary to make manual changes to the error correction capabilities when for instance new services are added to the information system, because the correct service requests for obtaining these new services will be stored in the memory automatically as soon as a service request aimed to obtain such a new service leads to successful identification of the service. An incorrect service request can thus be corrected by utilizing the content of these stored service requests.

The preferred embodiments of the method and information system are disclosed in the enclosed dependent claims 2 and 4 to 6.

BRIEF DESCRIPTION OF THE DRAWINGS

In the following, the present invention will be described in closer detail by way of example and with reference to the attached drawings, in which.

DESCRIPTION OF THE PREFERRED EMBODIMENTS

Figure 1:
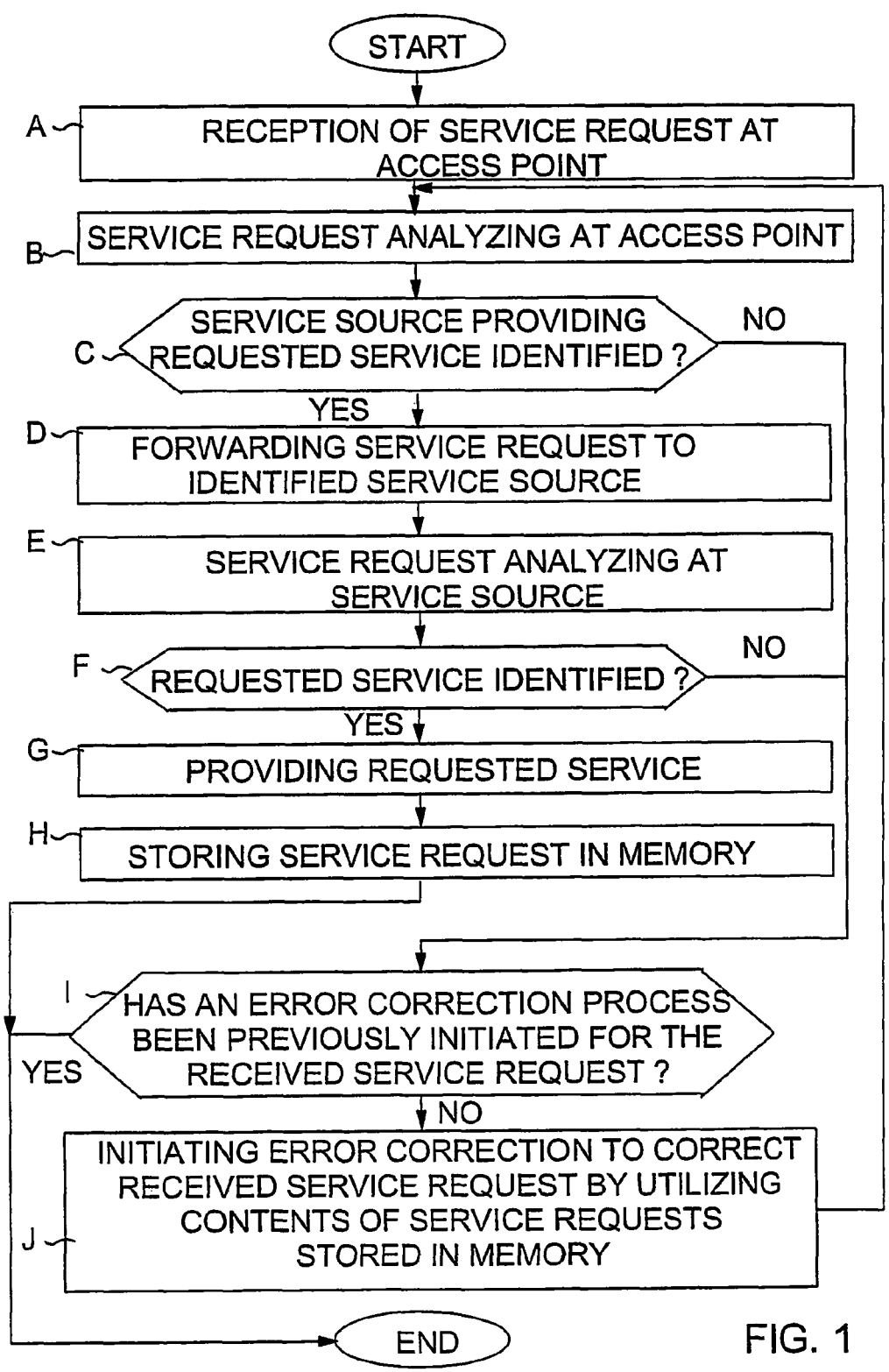
FIG. 1 is a flow diagram of a first preferred embodiment of a method for processing service requests.

FIG. 1 is a flow diagram of a first preferred embodiment of a method for processing service requests. In the following description it is assumed by way of example that the service requests are messages transmitted by subscriber stations of a mobile communication system. In that case the subscriber stations might consist of mobile stations such as cellular phones.

The service requests might be requests to receive predetermined data, for instance. Such data might consist of a new ringing tone or of a logo which the user of the subscriber station wants to download to his subscriber station.

In block A, a service request is received at an access point of the information system. The service request is analyzed by the access point in block B in order to identify the service source which provides the requested service. The term 'service source' refers in this context to an entity providing a specific service. One such service source might be a server arranged to receive service requests and to carry out one specific service. It is also possible that one single server can act as two or more service sources by carrying out several different and independent services.

The identification of the service source might be based on a keyword included in the service request. The term 'keyword' refers to any symbol string which can be used as an identifier to identify a particular service source. Examples of keywords which might be used by subscribers of a mobile communication system to obtain services are LOGO, TONE and PICTURE, for instance.

If the service source providing the requested service can be identified in block C, the service request is transmitted in block D from the access point to the service source providing the requested service. In the following it is assumed by way of example that the service request reads as follows: "LOGO GALAXY". In this case the service request is transmitted to the service source which provides the subscribers with the service of downloading logos to their subscriber stations.

In block E the service request is analyzed at the service source in order to identify the requested service. The identification of the requested service might be based on a parameter included in the service request. The term 'parameter' refers to any symbol string which can be used as an identifier to identify a particular service. In the above-mentioned example, the service request includes the parameter "GALAXY".

If the service source providing logo services to the subscribers is able to identify a service "GALAXY" (in this case a logo named GALAXY), this service is provided to the subscriber in block G (the logo GALAXY is transmitted to the subscriber station from where the service request was received). Finally in block H, the service request which has led to successful identification of a service is stored in a memory. Thus, in this case the service request "LOGO GALAXY" is stored in a memory.

If, however, it turns out in block C or block F that the service source providing the requested service or the requested service itself can not be identified, there exists the possibility that the service request includes an error. One possible error is a typing error in the keyword or in the parameter. In this case block I is entered.

Block I includes a check to determine if an error correction process has previously been initiated for the received service request. The intention is to avoid an endless loop by (in this example) carrying out only one attempt to correct each service request. If no previous error correction process has been initiated, block J is entered.

In block J, an error correction process is initiated in order to try to correct a service request which includes an error. The error correction process utilizes the service requests which have previously been stored in the memory mentioned in connection with block H. Thus, the memory includes only such service requests that have led to successful identification of the requested service.

In the following, it is assumed by way of example that the memory includes the service requests: "LOGO GALACTICA", "LOGO GALAXY", "TONE SUPERE", "WEATHER HELSINKI" and "WEATHER LONDON", and that a service request which reads "LOGO GALAY" has been received from a subscriber station. In this case the service source is identified in block C because the keyword "LOGO" is correct. However, the parameter "GALAY" includes a typing error and thus the requested service cannot be identified in block F. The error correction process initiated in block J searches through all service requests stored in the memory and compares the stored service requests with the received service request. The stored service request which most resembles the received one is selected for use. In the example the stored service request "LOGO GALAXY" is closest to the received service request "LOGO GALAY" as only a one-letter change is needed, in other words one letter (a missing X) needs to be added. The other alternatives would require more changes, and thus they are not equally close to the received service request.

The selected stored service request "LOGO GALAXY" is then used to correct the received service request such that the received service request is changed to correspond to the selected service request. After this the corrected service request is returned to block B for analysis and further processing such that eventually the subscriber is provided with the LOGO GALAXY even though the subscriber has made a typing error.

It should be observed that the comparison of the stored and received service requests described above is only a simplified example of how the closest stored service request can be selected. Other prior art solutions of comparing strings with each other and of selecting the closest one from a group of strings can also be used in the method of FIG. 1.

Figure 2:
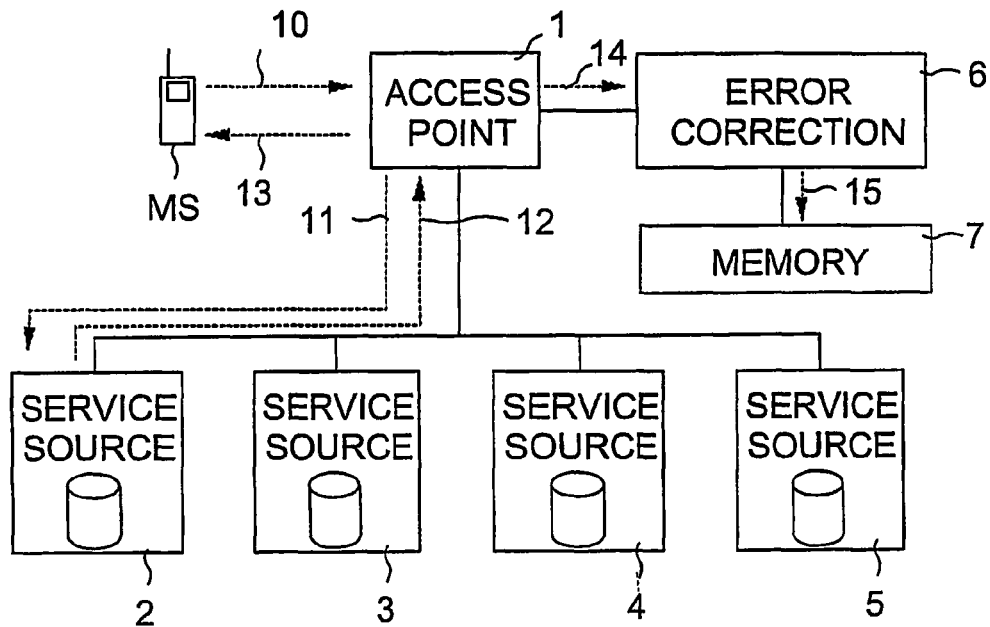
FIGS. 2 to 4 are block diagrams illustrating a first embodiment of an information system.
Figure 3:
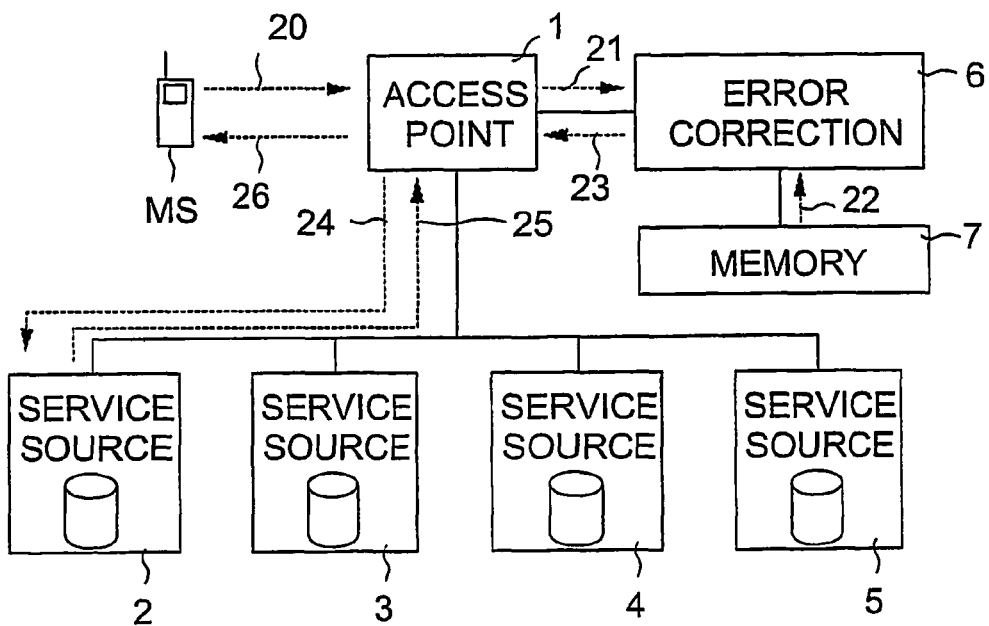
Figure 4:
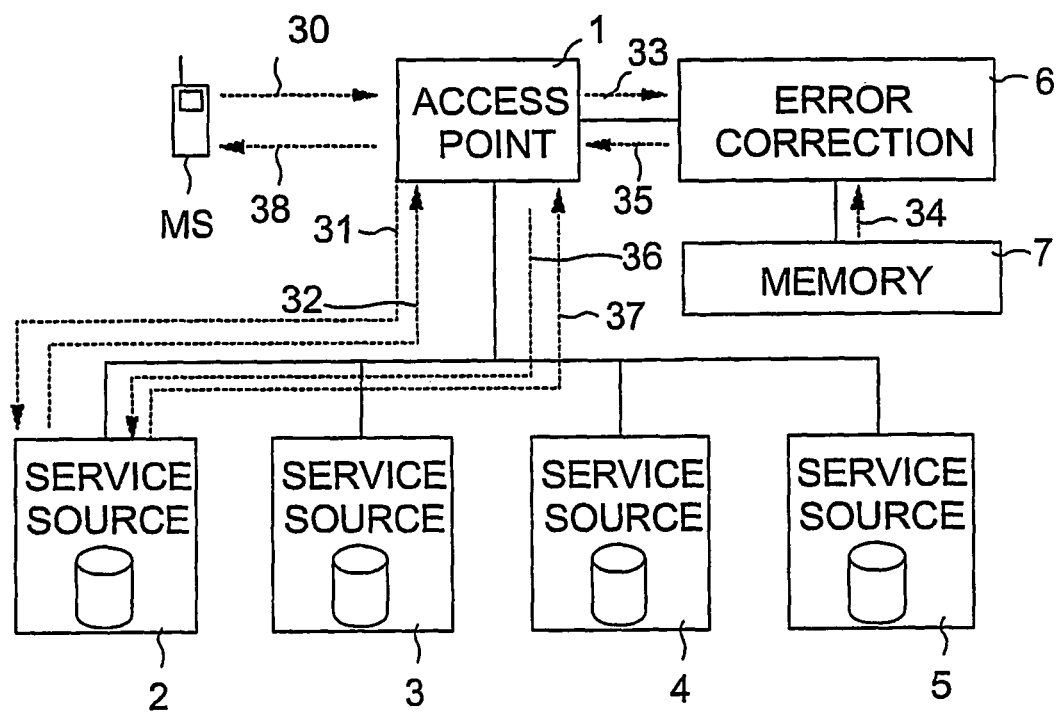

FIGS. 2 to 4 are block diagrams illustrating a first embodiment of an information system. The method described in connection with FIG. 1 can be utilized in the system of FIGS. 2 to 4.

It is assumed by way of example in FIGS. 2 to 4 that the information system is connected to a mobile communication system and that the subscriber stations MS used for transmitting service requests to the information system are mobile stations of this mobile communication system.

The information system includes an access point 1 connected to the mobile communication system (the mobile communication system is not shown in the figures). This access point might consist for instance of a server connected to a messaging center of the mobile communication system. The information system also includes service sources 2 to 5 which are connected to the access point. In the examples of FIGS. 2 to 4, each service source offers one single service to the subscribers. The service sources might be accomplished in practice as separate servers offering only one service or alternatively, it is possible that one or more servers acts as several service sources by offering a plurality of services. In the following it is assumed by way of example that:

service source 2 offers the subscribers the service of downloading logos (keyword LOGO),
service source 3 offers the subscribers the service of downloading ringing tones (keyword TONE),
service source 4 offers the subscribers the service of downloading pictures (keyword PICTURE), and
service source 5 offers the subscribers the service of downloading weather forecasts (keyword WEATHER).

The information system of FIGS. 2 to 4 also includes an error correction device 6. This error correction device 6 is capable of correcting errors in the service requests as will be explained later. The error correction device 6 has a self-learning capability, which enables it to automatically adapt itself to new services added to the system. The error correction device 6 and its associated memory 7 may be accomplished in practice as a separate server connected to the access point 1, or alternatively they can be integrated in the access point 1 (this alternative is not shown in the figures). In the latter case, the error correction device can consist of a computer program which is run by the server acting as the access point.

FIG. 2 illustrates a situation where a subscriber station MS transmits a service request leading to successful identification of the requested service. The transmitted service request is assumed by way of example to be "LOGO GALAXY", which means that the subscriber wants to download to his mobile station a logo named galaxy. The service request is forwarded by the mobile communication system to the access point 1 as indicated by arrow 10. The access point includes a memory, where the keywords (LOGO, TONE, PICTURE, WEATHER) of service sources 2 to 5 are stored. Thus, the access point 1 is able to identify the keyword LOGO of service source 2. After this the access point forwards 11 the service request to service source 2 offering the requested service.

Service source 2 identifies the parameter GALAXY and retrieves the logo named GALAXY from its database. This logo is transmitted 12 via the access point 1 and the mobile communication system to the subscriber station MS as indicated by arrow 13.

The access point 1 detects that the service request LOGO GALAXY has led to a successful identification of the requested service. Thus, the access point 1 forwards 14 this service request to the error correction device 6, which stores 15 it in the memory 7. Alternatively, service source 2 might be adapted to transmit a predetermined message to the error correction device 6 in order to inform the error correction device 6 that service request LOGO GALAXY has led to successful identification of the requested service. Also in this case, the error correction device 6 stores this service request in the memory 7.

The fact that the service requests which have led to successful identification of the requested service are stored in the memory means that the error correction device will obtain an automatic self-learning capability. Eventually the memory 7 will contain a list of all such service requests that the service sources 2 to 5 are able to deal with successfully. This list can then be used to correct such service requests that contain an error, as will be explained in connection with FIGS. 3 and 4.

FIG. 3 illustrates a situation where a subscriber station MS transmits a service request with an error in the keyword. By way of example it will be assumed that the service request transmitted 20 with the subscriber station MS reads: "LOHO GALAXY".

The access point 1 which has received the service request analyzes the service request, but no service source can be identified because the access point cannot identify any known keyword. The received service request is therefore forwarded 21 from the access point 1 to the error correction device 6.

The error correction device 6 retrieves 22 from the memory 7 the stored service requests and compares them with the received service request in order to select the stored service request which most resembles the received service request. In the following, assumed it is by way of example that the memory includes the service requests "LOGO GALACTICA", "LOGO GALAXY", "TONE SUPERE", "WEATHER HELSINKI" and "WEATHER LONDON". Thus, the error correction device will select the stored service request "LOGO GALAXY", which is closest to the received service request "LOHO GALAXY". The selected service request is used to correct the received service request such that the corrected service request will read: "LOGO GALAXY". This corrected service request is returned 23 to the access point 1.

The access point 1 analyzes the corrected service request, identifies the keyword LOGO and forwards 24 the corrected service request to service source 2 offering this service.

Service source 2 analyzes the corrected service request, identifies the parameter GALAXY and retrieves the logo named GALAXY from its database. This logo is transmitted 25 via the access point 1 and the mobile communication system to the subscriber station MS as indicated by arrow 26. Thus, the subscriber will obtain the desired service even though the service request transmitted by the subscriber had an error in it. It is not necessary to store in the memory 7 the corrected service request which has led to successful identification of the requested service, because this service request already exists in the memory 7.

FIG. 4 illustrates a situation where a subscriber station MS transmits a service request with an error in the parameter. By way of example it will be assumed that the service request transmitted 30 with the subscriber station MS reads: "LOGO GALAY".

The access point 1 identifies the keyword LOGO and forwards 31 the service request to service source 2 offering this service. The service source analyses the service request in order to identify a parameter indicating which specific service offered by the service source 2 has been requested by the subscriber. In this case, however, the service source is not able to identify any known parameter (as no logo named GALAY is available in the service source 2). Thus, service source 2 returns 32 the service request to the access point 1 in a message informing the access point that the requested service has not been identified.

The access point 1 forwards 33 the received service request to the error correction device 6, which carries out error correction as has been explained in connection with FIG. 3. Thus, the stored service requests are retrieved 34 from memory 7, the stored service requests are compared to the received service request, and the stored service request which most resembles the received service request is selected. In this case it is assumed that the stored service request "LOGO GALAXY" is selected. Finally, the received service request is corrected by using the selected service request to read "LOGO GALAXY". This corrected service request is forwarded 35 to the access point 1.

The access point 1 analyzes the corrected service request, identifies the keyword LOGO and forwards 36 the corrected service request to service source 2. The analyzing of the corrected service request at the service source 2 will lead to successful identification of the requested service as the parameter GALAXY is identified. Service source 2 then retrieves the logo named GALAXY from its database and transmits 37 it via the access point 1 and the mobile communication system to the subscriber station MS, as indicated by arrow 38. Also in this case, the subscriber will received the desired service even though the transmitted service request included an error in the parameter.

In the above examples of FIGS. 3 and 4, it has been assumed that the error correction device is able to find and select one single stored service request which is closest to the received service request. However, in practice it is possible that there are several alternative stored service requests that are all equally close to the received service request (containing an error). In that case the error correction device is not capable of deciding which stored service request it should use in the error correction. Therefore the error correction device does not return any corrected service request to the access point, but instead it might return a list of the closest stored service requests. The access point then determines that the error correction has failed and that the subscriber has not received the requested service. In this situation the access point transmits a message to the subscriber station informing the subscriber that the service has not been identified. Preferably this message includes the list of the closest stored service requests. The message might read as follows: "It appears that your message includes an error. Did you mean any of the following alternatives: LOGO GALAXY, LOGO GALACTIC? Please transmit a new message to obtain the service".

It is to be understood that the above description and the accompanying figures are only intended to illustrate the present invention. It will be obvious to those skilled in the art that the invention can be varied and modified also in other ways without departing from the scope and spirit of the invention disclosed in the attached claims.

The invention claimed is:

1. A method of processing service requests in an information system including a common access point and at least two service sources offering services, said method comprising:
   receiving a service request at said access point,
   analyzing said service request at said access point in order to identify a predetermined keyword indicating a service source offering the requested service,
   forwarding said service request to a service source identified in said analysis,
   analyzing said service request at said service source in order to identify the requested service, providing said identified service,
   storing, in a memory containing only service requests whose contents are correct, said service request if the service request has led to successful identification of the requested service,
   initiating an error correction process to correct the received service request by utilizing service requests stored in said memory containing only service requests whose contents are correct, if said analyzing at said access point or said analyzing at said service source fails for the received service request, as no service source or no service can be identified, and
   repeating said analyzing at the access point and/or service source for the corrected service request, and providing an identified service to the source of the service request if a service can be identified.

2. A method according to claim 1, wherein the correction of a received service request is carried out by
   comparing the contents of the received service request with the contents of the stored service requests,
   selecting the stored service request which, based on the comparison, is closest to the received service request, and
   substituting at least a part of the contents of the received service request with at least a part of the contents of the selected service request.

3. An information system comprising:
   subscriber stations,
   at least two service sources providing a respective service to subscriber stations of the system, and
   an access point providing said subscriber stations with access to services offered by said service sources, said access point being arranged to analyze a service request received from a subscriber station in order to identify a predetermined keyword indicating the service source offering the requested service, and to forward said service request to the service source offering said service,
   said service sources being connected to the access point in order to receive a service request forwarded by said access point, and arranged to analyze a received service request in order to identify the requested service and to provide the subscriber station with the requested service, said system further comprising:
   a memory for storing only service requests which have led to successful identification of the requested service and whose contents are correct, and
   an error correction device arranged to correct a received service request by utilizing the service requests stored in the memory, if said analyzing at said access point or said analyzing at said service source fails for the received service request, as no service source or no service can be identified,
   wherein said access point is arranged to process the corrected service request by carrying out said analyzing and forwarding to a service source, and said service sources are arranged to carry out said analyzing in order to identify the requested service and to provide the service to the subscriber station having transmitted the service request, when receiving such a corrected service request.

4. An information system according to claim 3, wherein said error correcting device is arranged to compare the contents of the received service request with the contents of the service requests stored in said memory, to select the stored service request which, based on the comparison, is closest to the received service request, and to substitute at least a part of the contents of the received service request with at least a part of the contents of the selected service request.

5. An information system according to claim 3, wherein said access point is connected to a mobile communication system, said subscriber stations are subscriber stations of the mobile communication system, and the service requests are messages transmitted with said subscriber stations via the mobile communication system to the access point.

6. An information system according to claim 4, wherein said access point is connected to a mobile communication system, said subscriber stations are subscriber stations of the mobile communication system, and the service requests are messages transmitted with said subscriber stations via the mobile communication system to the access point.

7. An information system according to claim 3, wherein at least one of said service sources provides a service involving transmission of data to a subscriber station which has transmitted a service request, said service source comprising a database containing data, and that said service source is arranged to analyze a received service request in order to identify the requested service, to retrieve, from said database, data associated with the identified service request, and to transmit said retrieved data via said information system to said subscriber station.

8. An error correction device, comprising:
   a memory containing only service requests whose contents are correct, wherein,
   said error correction device is arranged to
   correct a received service request by utilizing information stored in the memory containing only the service requests whose contents are correct,
   receive and store, in said memory, service requests which have led to successful identification of the requested service and whose contents are correct, the service requests being stored in said memory as soon as the service requests have led to successful identification of a requested new service,
   correct the contents of a received service request by utilizing the service requests stored in the memory whose requested new services have been successfully identified, and
   transmit said corrected service request for further processing.

9. The method according to claim 1, wherein the keyword is a user entered search term.

10. The method according to claim 1, wherein the requested service is human perceivable data.

* * * * *

UNITED STATES PATENT AND TRADEMARK OFFICE
CERTIFICATE OF CORRECTION

PATENT NO.       : 8,458,143 B2
APPLICATION NO. : 10/529243
DATED            : June 4, 2013
INVENTOR(S)      : Loven et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2501 days.

Signed and Sealed this
Eighth Day of September, 2015

Michelle K. Lee
*Director of the United States Patent and Trademark Office*